US012763474B2

(12) United States Patent
Liu et al.

(10) Patent No.: US 12,763,474 B2
(45) Date of Patent: Oct. 13, 2026

(54) ANTENNA APPARATUS AND TERMINAL DEVICE

(71) Applicant: Huawei Technologies Co., Ltd., Shenzhen (CN)

(72) Inventors: Qing Liu, Shenzhen (CN); Qi Shi, Shenzhen (CN); Qun Guo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 241 days.

(21) Appl. No.: 18/706,129

(22) PCT Filed: Oct. 20, 2022

(86) PCT No.: PCT/CN2022/126348
§ 371 (c)(1),
(2) Date: Apr. 30, 2024

(87) PCT Pub. No.: WO2023/078090
PCT Pub. Date: May 11, 2023

(65) Prior Publication Data
US 2026/0128525 A1 May 7, 2026

(30) Foreign Application Priority Data
Nov. 5, 2021 (CN) ......................... 202111304069.X

(51) Int. Cl.
*H01Q 9/42* (2006.01)
*H01Q 1/24* (2006.01)
*H01Q 5/335* (2015.01)
*H01Q 9/04* (2006.01)

(52) U.S. Cl.
CPC ............... *H01Q 9/42* (2013.01); *H01Q 1/243* (2013.01); *H01Q 5/335* (2015.01); *H01Q 9/0421* (2013.01)

(58) Field of Classification Search
CPC H01Q 9/42; H01Q 1/24; H01Q 5/335; H01Q 9/04
See application file for complete search history.

(56) References Cited

U.S. PATENT DOCUMENTS

2007/0257847 A1* 11/2007 Su ............................ H01Q 5/40 343/700 MS
2008/0136727 A1 6/2008 Bit-Babik et al.
(Continued)

FOREIGN PATENT DOCUMENTS

CN 206098678 U 4/2017
CN 104377444 B 9/2018
(Continued)

*Primary Examiner* — Thien M Le
(74) *Attorney, Agent, or Firm* — Conley Rose, P.C.

(57) ABSTRACT

An antenna apparatus includes an antenna patch, a feed line, a capacitor, and a ground line. One end of the feed line is connected to the antenna patch. The other end of the feed line is connected to the capacitor in series. One end of the ground line is connected to the antenna patch. The other end of the ground line is configured to connect to the ground plane. The antenna patch and the ground plane remain spaced apart. The antenna patch, the feed line, the capacitor and the ground line are together arranged in a configuration to excite operation modes corresponding to three resonances.

20 Claims, 10 Drawing Sheets

(56) References Cited

U.S. PATENT DOCUMENTS

| | | | | |
|---|---|---|---|---|
| 2012/0306698 | A1* | 12/2012 | Warnick | H01Q 5/35 343/893 |
| 2014/0132473 | A1* | 5/2014 | Isom | H01Q 1/422 343/855 |
| 2014/0145883 | A1* | 5/2014 | Baks | H01Q 1/2283 343/700 MS |
| 2014/0227985 | A1* | 8/2014 | Sanford | H01Q 3/08 455/90.3 |
| 2019/0207310 | A1 | 7/2019 | Gu | |
| 2019/0319364 | A1* | 10/2019 | Yang | H01Q 5/364 |
| 2020/0287298 | A1* | 9/2020 | Ueda | H01Q 9/0407 |
| 2021/0135334 | A1* | 5/2021 | Zhou | H01Q 9/0478 |
| 2021/0159610 | A1* | 5/2021 | Manesh | H01Q 21/24 |
| 2021/0175609 | A1* | 6/2021 | Ryoo | H01Q 9/42 |

FOREIGN PATENT DOCUMENTS

| | | | |
|---|---|---|---|
| CN | 112490639 | A | 3/2021 |
| CN | 112751159 | A | 5/2021 |
| JP | 2010288175 | A | 12/2010 |
| JP | 3204587 | U | 6/2016 |
| WO | 2016127344 | A1 | 8/2016 |

* cited by examiner

ANTENNA APPARATUS AND TERMINAL DEVICE

CROSS-REFERENCE TO RELATED APPLICATIONS

This is a National Stage of International Patent Application No. PCT/CN2022/126348, filed on Oct. 20, 2022, which claims priority to Chinese Patent Application No. 202111304069.X, filed on Nov. 5, 2021, both of which are hereby incorporated by reference in their entireties.

TECHNICAL FIELD

This application relates to the field of communication technologies, and in particular, to an antenna apparatus and a terminal device.

BACKGROUND

With the development of communication technologies, various wireless terminal products are increasingly popular. While enjoying all kinds of conveniences brought by wireless communication devices, the public has a higher requirement for portability of terminals, according to which an antenna is required to integrate an increasing quantity of frequency bands. A bottleneck of antenna design lies in low-frequency bandwidth expansion due to long wavelengths of a low-frequency band and a small terminal size.

In conventional technologies, an antenna size is generally increased to expand a low-frequency bandwidth. However, an excessively large antenna size is not conducive to design of dimensions of a terminal product. In addition, in the conventional technologies, an antenna switch is also used to switch an operating status of the antenna to cover the low-frequency bandwidth. However, adding the antenna switch incurs additional costs, and brings other technical problems related to the antenna switch.

SUMMARY

An objective of this application is to provide an antenna apparatus and a terminal device, to resolve a problem in conventional technologies that an antenna size becomes excessively large to expand a low-frequency bandwidth or costs are incurred by adding an antenna switch to expand a low-frequency bandwidth.

According to a first aspect of this application, an antenna apparatus is provided, including an antenna patch, a feed line, a capacitor, and a ground line. One end of the feed line is connected to the antenna patch to feed the antenna patch. The other end of the feed line is connected to the capacitor in series. The capacitor is connected to a feed point of a ground plane. One end of the ground line is connected to the antenna patch. The other end of the ground line is configured to connect to the ground plane. The antenna patch and the ground plane remain spaced apart. The antenna patch, the feed line, and the ground line work together to excite operation modes corresponding to three resonances, to increase a low-frequency bandwidth of the antenna apparatus.

According to the antenna apparatus provided in this application, the antenna patch, the feed line, the capacitor, and the ground line may work together, so that the antenna apparatus and the ground plane together form three resonance circuits. In other words, the operation modes corresponding to three resonances are excited. As a result, the antenna apparatus achieves, without any additional component like an antenna switch, a relatively large low-frequency bandwidth that can cover a frequency band of 698 MHz to 1500 MHz. In addition, while good radiation performance is ensured, a structure of the antenna apparatus is simplified and a size of the antenna apparatus is decreased, so that the antenna apparatus is simpler and more compact, and meets a requirement for a miniaturized design.

In a possible implementation, the antenna patch includes a first horizontal radiating metal patch, a first vertical radiating metal patch, and a second vertical radiating metal patch. The first vertical radiating metal patch and the second vertical radiating metal patch are respectively vertically connected to two ends of the first horizontal radiating metal patch, and the first vertical radiating patch and the second vertical radiating metal patch extend toward the ground plane. The one end of the feed line and the one end of the ground line that face away from the ground plane each are connected to the first horizontal radiating metal patch, and the feed line is disposed between the ground line and the first vertical radiating metal patch. In this way, an antenna can have good radiation performance, and low-frequency bandwidth expansion is facilitated.

In a possible implementation, the ground line is connected to a center position of the first horizontal radiating metal patch, and the first vertical radiating metal patch and the second vertical radiating metal patch are symmetrically distributed with respect to a position of the ground line. This helps the antenna apparatus evenly radiate electromagnetic waves.

In a possible implementation, the operation modes corresponding to three resonances are a first common mode, a differential mode, and a second common mode. In the second common mode, a local current is sequentially directed through the feed line, a part that is of the first horizontal radiating metal patch and that is located between the feed line and the first vertical radiating metal patch, and the first vertical radiating metal patch. A sum of a length of the feed line, a length of the part that is of the first horizontal radiating metal patch and that is located between the feed line and the first vertical radiating metal patch, and a length of the first vertical radiating metal patch is ¼ of a resonance wavelength of the second common mode. Therefore, it can be ensured that a resonance circuit formed by the feed line, the antenna patch, and the ground plane can operate in a frequency band corresponding to the second common mode, so that radiation performance is improved.

In a possible implementation, the antenna apparatus further includes a dielectric block. The dielectric block is connected to the ground plane, and the antenna patch, the feed line, and the ground line each are attached to the dielectric block. The antenna apparatus is attached to the dielectric block, so that the antenna apparatus forms an on-board antenna. There is no clearance area for the antenna, and therefore less space on the ground plane is used. This helps arrange more components.

In a possible implementation, the antenna patch includes a second horizontal radiating metal patch, a third vertical radiating metal patch, and a fourth vertical radiating metal patch, the third vertical radiating metal patch and the fourth vertical radiating metal patch are respectively vertically connected to two ends of the second horizontal radiating metal patch, and the second horizontal radiating metal patch, the third vertical radiating metal patch, and the fourth vertical radiating metal patch each are attached to a top face of the dielectric block. The feed line and the ground line each are attached to a side face that is of the dielectric block and that is adjacent to the top face, and the one end of the feed line and the one end of the ground line that face away from the ground plane each are connected to the second horizontal radiating metal patch. Therefore, there is no need to reserve a clearance area on the ground plane for the antenna apparatus with the foregoing structure, and less space on the ground plane is used. In addition, the antenna apparatus is attached to the dielectric block, so that the antenna has a larger radiation area, and stability of the antenna apparatus can be ensured.

In a possible implementation, a length of the third vertical radiating metal patch is less than a length of the fourth vertical radiating metal patch. This helps excite three different resonances, to expand the low-frequency bandwidth of the antenna apparatus.

In a possible implementation, the ground line is connected to a position that is a first distance from a center position of the second horizontal radiating metal patch in a direction toward the third vertical radiating metal patch. This helps excite three different resonances, to expand the low-frequency bandwidth of the antenna apparatus.

In a possible implementation, the first distance is 3 mm.

In a possible implementation, the feed line and the ground line are spaced apart by a preset second distance. Due to the spacing, the three resonances excited by the antenna apparatus can cover 698 MHz to 1500 MHz.

In a possible implementation, the second distance ranges from 6.5 mm to 8 mm.

In a possible implementation, the low-frequency bandwidth covers a frequency band of 698 MHz to 1500 MHz.

According to a second aspect of this application, a terminal device is further provided, including the antenna apparatus according to the first aspect of this application.

It should be understood that the foregoing general descriptions and the following detailed descriptions are merely examples, and should not limit this application.

REFERENCE NUMERALS

Figure 1:
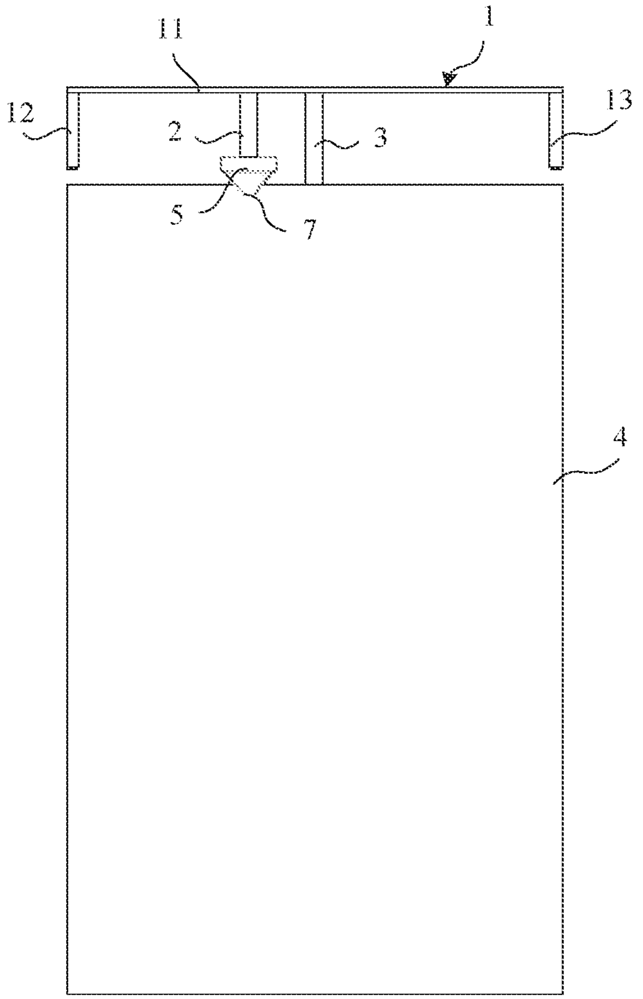
FIG. 1 is a schematic diagram of a state in which an antenna apparatus is connected to a ground plane according to an embodiment of this application.

1: antenna patch;
- 11: first horizontal radiating metal patch;
- 12: first vertical radiating metal patch;
- 13: second vertical radiating metal patch;
- 14: second horizontal radiating metal patch;
- 15: third vertical radiating metal patch;
- 16: fourth vertical radiating metal patch;

2: feed line;
3: ground line;
4: ground plane;
5: capacitor;
6: dielectric block;
- 61: top face;
- 62: side face;

7: feed point.

The accompanying drawings herein are incorporated into this specification and constitute a part of this specification, show embodiments conforming to this application, and are used, together with this specification, to explain the principle of this application.

DESCRIPTION OF EMBODIMENTS

To make objectives, technical solutions, and advantages of this application clearer, the following further describes this application in detail with reference to the accompanying drawings and embodiments. It should be understood that the specific embodiments described herein are merely used to explain this application, but are not intended to limit this application.

In descriptions of this application, unless otherwise clearly specified and limited, the terms "first" and "second" are merely used for description, and shall not be understood as an indication or implication of relative importance. Unless otherwise specified or stated, the term "a plurality of" means two or more. The terms "connected", "fastened", and the like should be understood in a broad sense. For example, the term "connected" may be fixedly connected, detachably connected, integrally connected, or electrically connected; or may be directly connected or indirectly connected through an intermediate medium. A person of ordinary skill in the art may understand specific meanings of the terms in this application based on specific cases.

In the descriptions of this specification, it should be understood that orientation terms such as "on" and "below" described in embodiments of this application are described from perspectives shown in the accompanying drawings, and should not be construed as a limitation on embodiments of this application. In addition, in the context, it should be further understood that, when it is mentioned that one element is connected "on" or "below" another element, the element can be directly connected "on" or "below" the another element, or may be indirectly connected "on" or "below" the another element through an intermediate element.

An antenna is a common apparatus for sending and receiving radio signals, and is usually integrated into various terminal devices, such as a mobile phone, a tablet computer, a reader, and a sound box. As the public has a higher requirement for portability of the terminal device, the antenna needs to integrate an increasing quantity of frequency bands. However, due to long wavelengths of a low-frequency band, to expand a low-frequency bandwidth, an overall size of the antenna needs to be increased, which is not feasible for a terminal device with a relatively small size. Consequently, there is a relatively large limitation on low-frequency bandwidth expansion. In addition, in conventional technologies, there is also a technology in which an antenna switch is used to switch an operating status of the antenna to cover the low-frequency bandwidth. However, application of the antenna switch incurs great costs.

Figure 2:
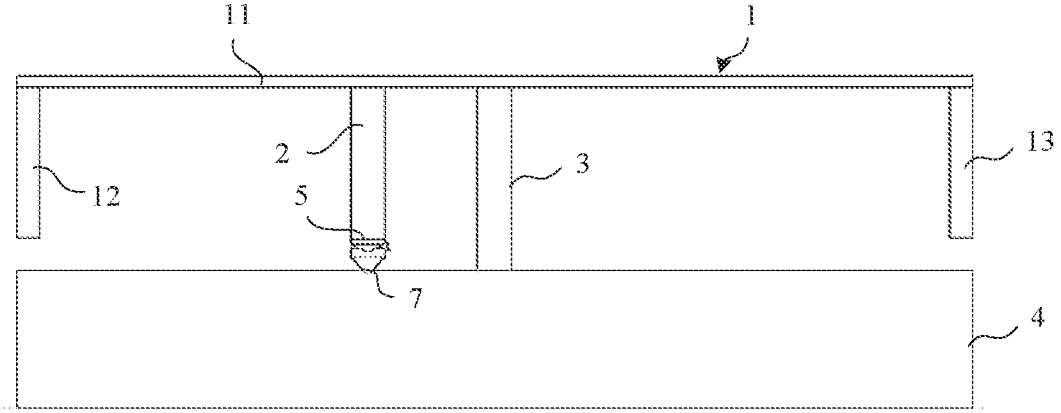
FIG. 2 is an enlarged view of a position at which the antenna apparatus is located in FIG. 1.

Therefore, embodiments of this application provide an antenna apparatus. FIG. 1 is a schematic diagram of a state in which an antenna apparatus is connected to a ground plane according to an embodiment of this application. FIG. 2 is an enlarged view of a position at which the antenna apparatus is located in FIG. 1. As shown in FIG. 1 and FIG. 2, the antenna apparatus includes an antenna patch 1, a feed line 2, a capacitor 5, and a ground line 3. One end of the feed line 2 is connected to the antenna patch 1 to feed the antenna patch 1. The other end of the feed line 2 is connected to the capacitor 5 in series. The capacitor 5 is connected to a feed point 7 of a ground plane 4. One end of the ground line 3 is connected to the antenna patch 1. The other end of the ground line 3 is configured to connect to the ground plane 4. The antenna patch 1 and the ground plane 4 remain spaced apart. The antenna patch 1, the feed line 2, and the ground line 3 work together to excite operation modes corresponding to three resonances, to increase a low-frequency bandwidth of the antenna apparatus.

According to the antenna apparatus, the antenna patch 1, the feed line 2, the capacitor 5, and the ground line 3 may work together, so that the antenna apparatus and the ground plane 4 together form three resonance circuits. In other words, the operation modes corresponding to three resonances are excited. In this way, the low-frequency bandwidth of the antenna apparatus can be expanded to cover a frequency band of 698 MHz to 1500 MHz, so that the antenna apparatus can operate in frequency bands such as B12, B17, B5, B8, and B11, and can have good radiation performance across all the frequency bands. The antenna apparatus can be used in a vehicle terminal device or another type of terminal device as a cellular communication antenna. The cellular communication antenna generally is required to support 698 MHz to 960 MHz at low frequencies. Therefore, the antenna can achieve a relatively large low-frequency bandwidth without any additional component like an antenna switch. In addition, while good radiation performance is ensured, a structure of the antenna apparatus is simplified and a size of the antenna apparatus is decreased, so that the antenna apparatus is simpler and more compact, and meets a requirement for a miniaturized design.

As shown in FIG. 1 and FIG. 2, a capacitance value in this embodiment is 1.5 pF. Due to the capacitor 5, the antenna can form three resonance circuits, to implement bandwidth expansion. As a result, better port matching is implemented for the antenna in a required specific frequency band, and there is no need to design a complex shape for the antenna to change a resonance frequency. This helps simplify a shape of the antenna.

Specifically, the ground plane 4 may be a PCB ground plane 4, and the PCB ground plane 4 has a clearance area near an edge of the PCB ground plane 4. The clearance area is a region covered by a non-conductive material, and the clearance area only needs to be large enough to accommodate the antenna apparatus. A shape of the PCB ground plane 4 may be a rectangle, a square, a polygon, or the like, and a shape of the clearance area may be a rectangle, a square, a polygon, or the like. This is not specifically limited in this embodiment. The antenna apparatus is disposed in the clearance area and forms an off-board antenna apparatus.

In a specific implementation, as shown in FIG. 1 and FIG. 2, the antenna patch 1 includes a first horizontal radiating metal patch 11, a first vertical radiating metal patch 12, and a second vertical radiating metal patch 13. The first vertical radiating metal patch 12 and the second vertical radiating metal patch 13 are respectively vertically connected to two ends of the first horizontal radiating metal patch 11, and the first vertical radiating patch and the second vertical radiating metal patch 13 extend toward the ground plane 4. The one end of the feed line 2 and the one end of the ground line 3 that face away from the ground plane 4 each are connected to the first horizontal radiating metal patch 11, and the feed line 2 is disposed between the ground line 3 and the first vertical radiating metal patch 12.

Specifically, the first horizontal radiating metal patch 11, the first vertical radiating metal patch 12, and the second vertical radiating metal patch 13 each are a sheet structure made of a metal with good conductivity, for example, a steel sheet or a copper sheet. The first horizontal radiating metal patch 11, the first vertical radiating metal patch 12, and the second vertical radiating metal patch 13 may radiate an electromagnetic wave signal. The first horizontal radiating metal patch 11 extends in a direction parallel to the ground plane 4. The first vertical radiating metal patch 12 and the second vertical radiating metal patch 13 each are perpendicular to the first horizontal radiating metal patch 11, extend toward the ground plane 4, and remain spaced from the ground plane 4 by a specific distance. Therefore, the first horizontal radiating metal patch 11, the first vertical radiating metal patch 12, and the second vertical radiating metal patch 13 form, through enclosure, a T-shaped box structure with an opening on one side. In this way, the antenna can have good radiation performance, and low-frequency bandwidth expansion is facilitated.

The first vertical radiating metal patch 12 and the second vertical radiating metal patch 13 may be soldered to the first horizontal radiating metal patch 11. Certainly, the first horizontal radiating metal patch 11, the first vertical radiating metal patch 12, and the second vertical radiating metal patch 13 may alternatively be an integrated structure.

In a specific implementation, the ground line 3 is connected to a center position of the first horizontal radiating metal patch 11, and the first vertical radiating metal patch 12 and the second vertical radiating metal patch 13 are symmetrically distributed with respect to a position of the ground line 3. The ground line 3 is connected to the first horizontal radiating metal patch 11 at a position halfway along a length of the first horizontal radiating metal patch 11. This helps the antenna apparatus evenly radiate electromagnetic waves.

In this embodiment, the length of the first horizontal radiating metal patch 11 is 83 mm, a distance between the first horizontal radiating metal patch 11 and the ground plane 4 is 18 mm, a width of the ground line 3 is 3 mm, and a width of the feed line 2 is 3 mm. The feed line 2 and the ground line 3 are spaced apart by a preset second distance. Specifically, the second distance may range from 6.5 mm to 8 mm. In this embodiment, the feed line 2 and the ground line 3 are spaced apart by 8 mm. Due to the spacing, three resonances excited by the antenna apparatus can cover 698 MHz to 1500 MHz.

Certainly, dimensions of the antenna patch 1, the feed line 2, and the ground line 3 may also be adaptively adjusted. In this way, a resonance frequency of the antenna apparatus can be adjusted, so that the antenna apparatus can be used in different application scenarios.

Figure 3:
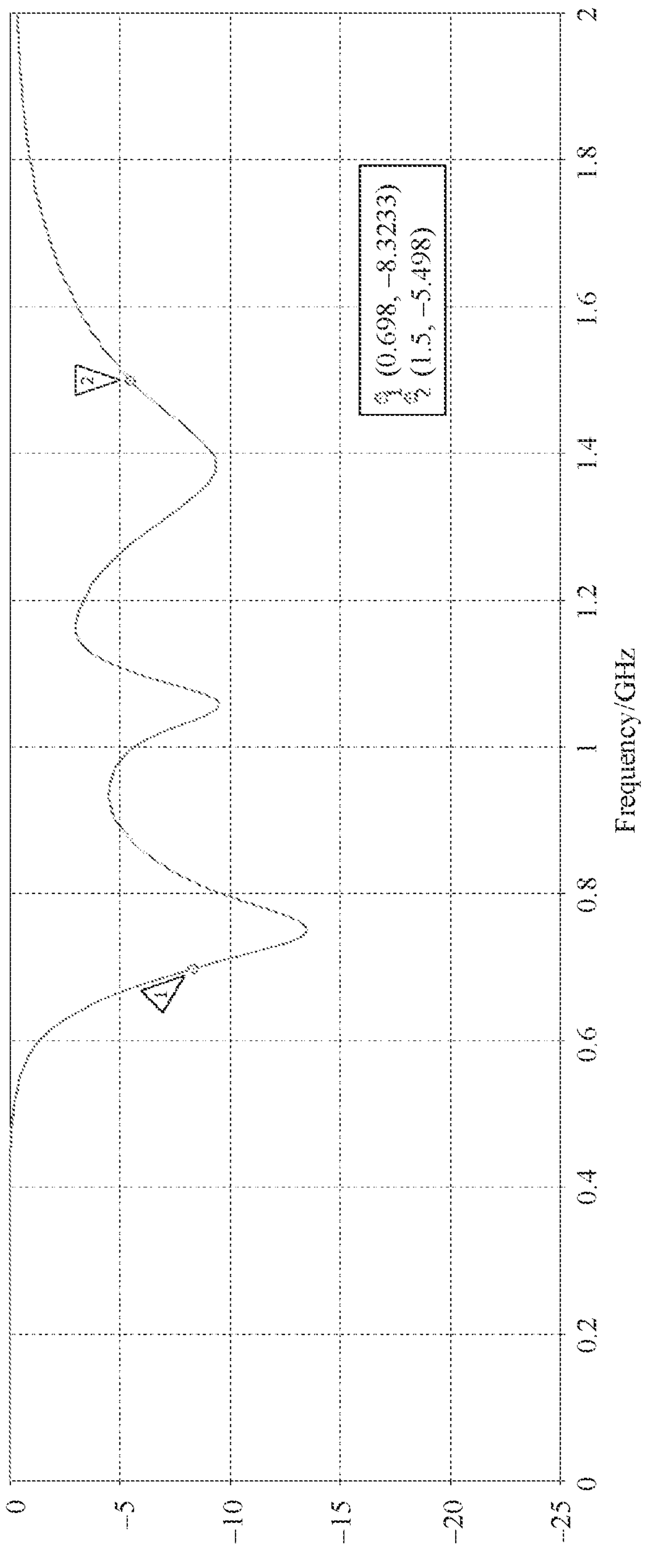
FIG. 3 is a diagram of a simulated S11 curve of an antenna apparatus according to an embodiment of this application.
Figure 4:
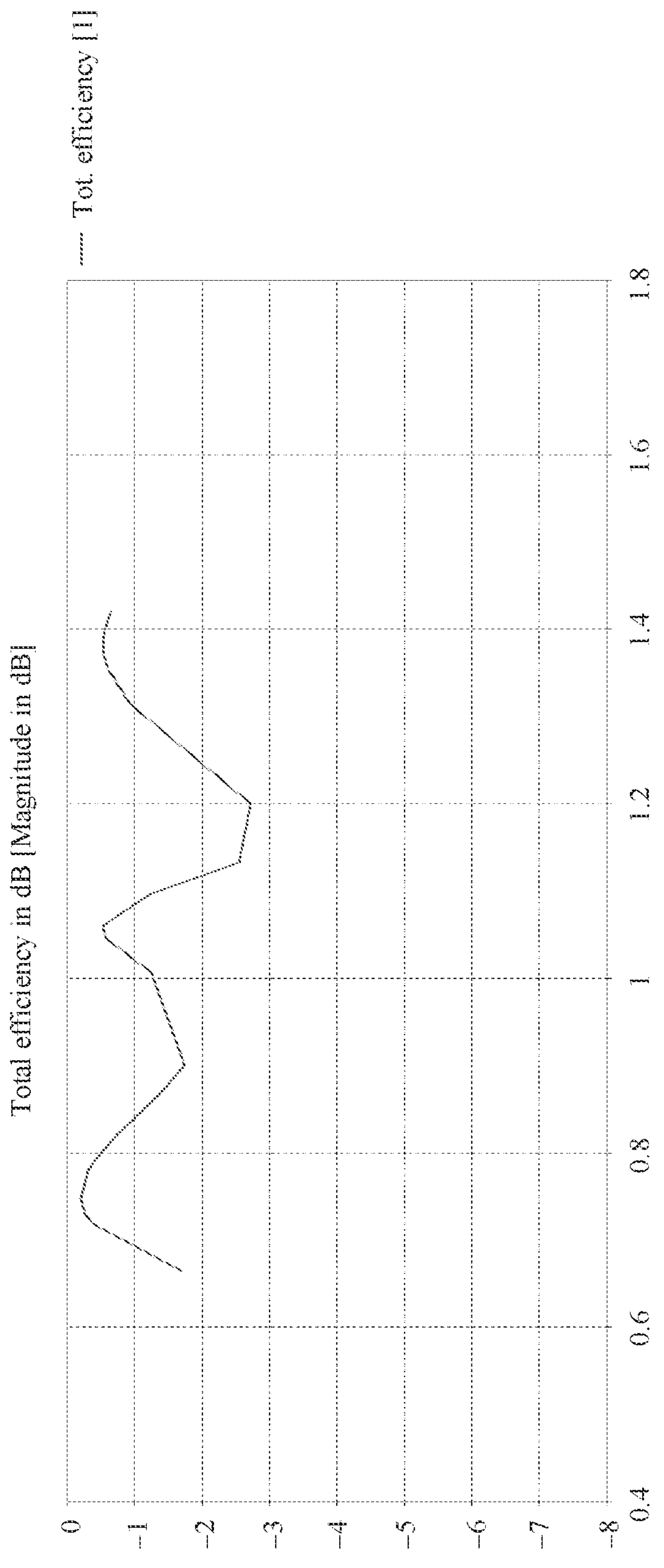
FIG. 4 is a diagram of an efficiency curve of an antenna apparatus according to an embodiment of this application.

FIG. 3 is a diagram of a simulated S11 curve of an antenna apparatus according to an embodiment of this application. S11 represents input return loss. As shown in FIG. 3, the antenna apparatus excites three resonances that can cover a low-frequency bandwidth of 698 MHz to 1500 MHz. At a frequency of 698 MHz, the return loss is −8.3233 dB. At a frequency of 1500 MHz, the return loss is −5.498 dB. Therefore, in the low-frequency bandwidth of 698 MHz to 1500 MHz, the return loss of the antenna apparatus is relatively low, and the antenna apparatus has good radiation performance. FIG. 4 is a diagram of an efficiency curve of an antenna apparatus according to an embodiment of this application. As shown in FIG. 4, the antenna apparatus has good radiation performance in a frequency band of 698 MHz to 1500 MHz.

Figure 5:
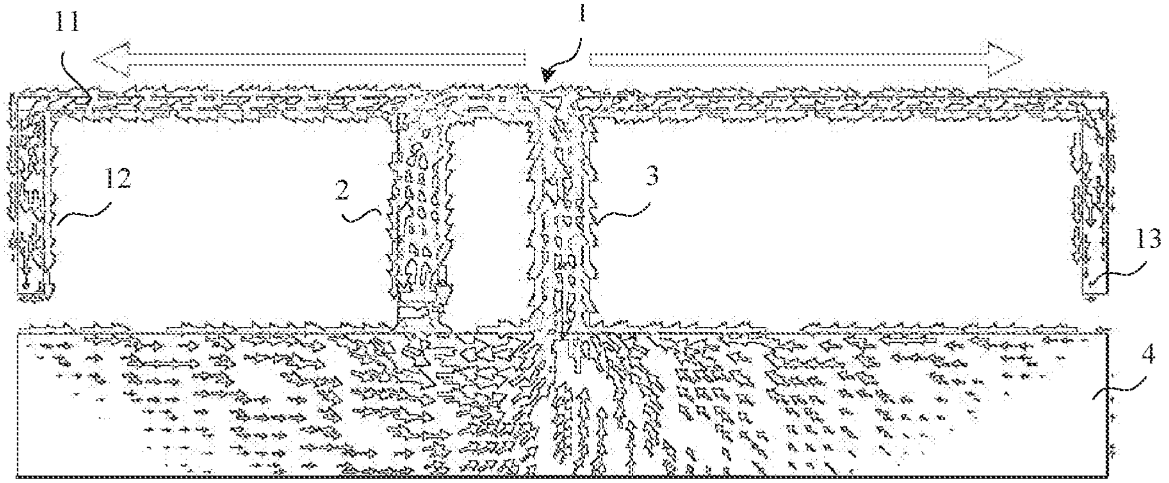
FIG. 5 is a schematic diagram of current distribution of an antenna apparatus in a first common mode according to an embodiment of this application.
Figure 6:
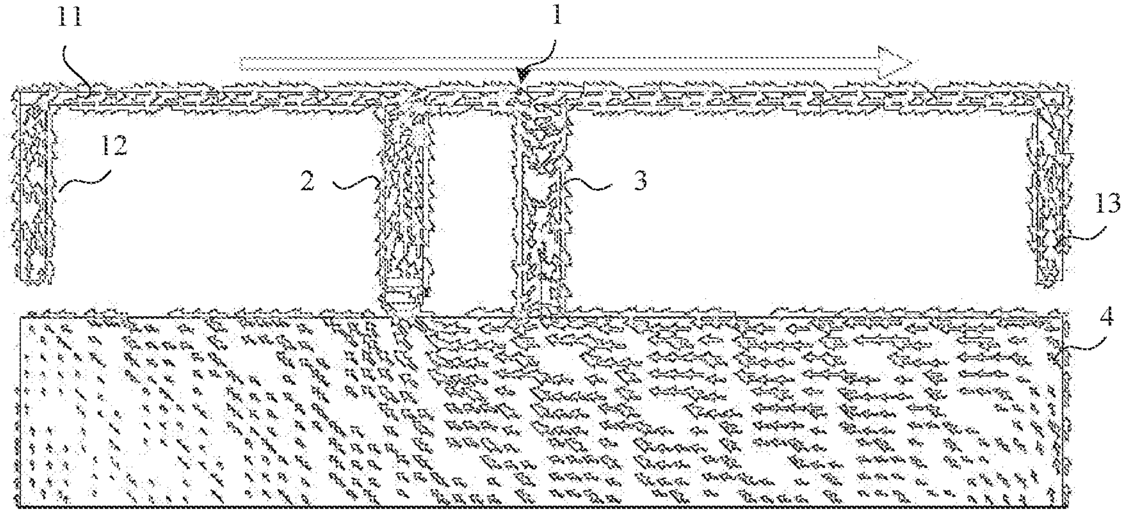
FIG. 6 is a schematic diagram of current distribution of an antenna apparatus in a differential mode according to an embodiment of this application.
Figure 7:
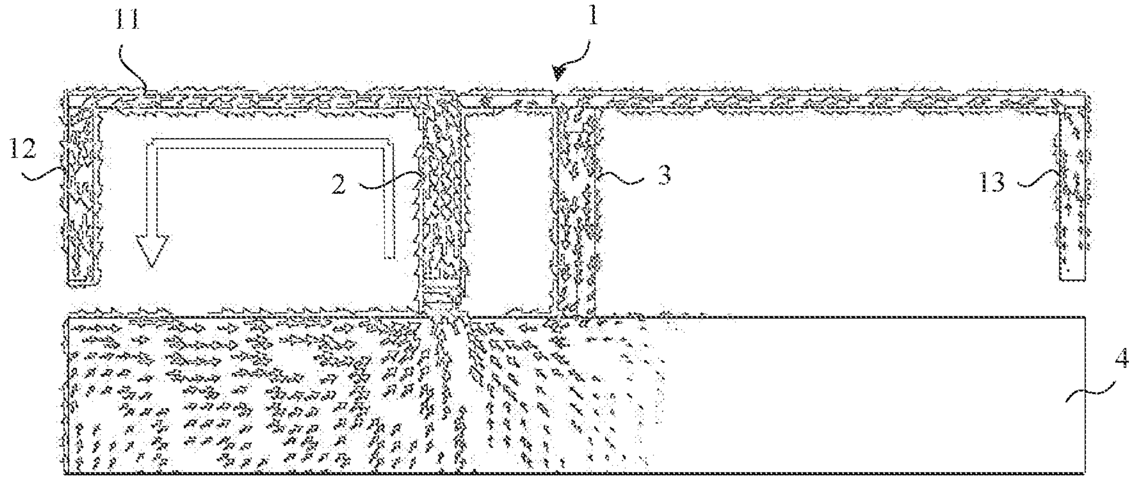
FIG. 7 is a schematic diagram of current distribution of an antenna apparatus in a second common mode according to an embodiment of this application.

In this embodiment, the operation modes corresponding to three resonances are a first common mode, a differential mode, and a second common mode. FIG. 5 is a schematic diagram of current distribution of an antenna apparatus in a first common mode according to an embodiment of this application. FIG. 6 is a schematic diagram of current distribution of an antenna apparatus in a differential mode according to an embodiment of this application. FIG. 7 is a schematic diagram of current distribution of an antenna apparatus in a second common mode according to an embodiment of this application. As shown in FIG. 5 to FIG. 7, the antenna patch 1, the feed line 2, the ground line 3, and the ground plane 4 form three different resonance circuits. The three resonance circuits cover different low-frequency bands. As a result, the antenna apparatus achieves a relatively large low-frequency bandwidth.

It should be noted that, as shown in FIG. 7, a local current in the second common mode is sequentially directed through the feed line 2, a part that is of the first horizontal radiating metal patch 11 and that is located between the feed line 2 and the first vertical radiating metal patch 12, and the first vertical radiating metal patch. A sum of a length of the feed line 2, a length of the part that is of the first horizontal radiating metal patch 11 and that is located between the feed line 2 and the first vertical radiating metal patch 12, and a length of the first vertical radiating metal patch is ¼ of a resonance wavelength in the second common mode. Therefore, it can be ensured that the resonance circuit formed by the feed line 2, the antenna patch 1, and the ground plane 4 can operate in a frequency band corresponding to the second common mode, so that radiation performance is improved.

Figure 8:
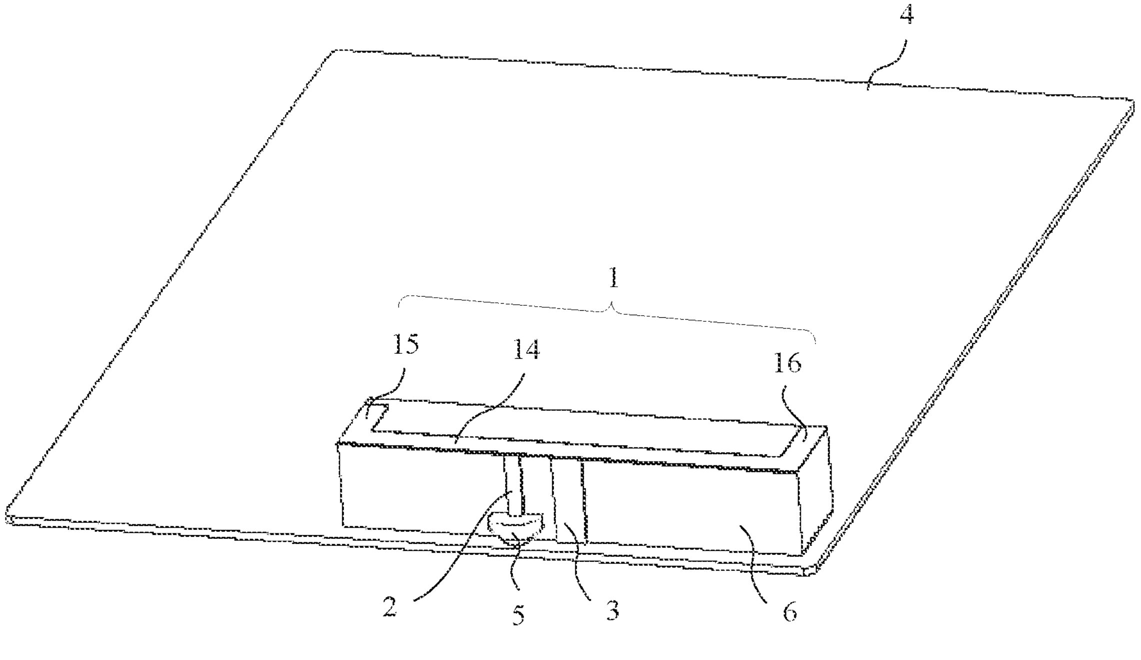
FIG. 8 is a schematic diagram of a state in which an antenna apparatus is connected to a ground plane according to another embodiment of this application.
Figure 9:
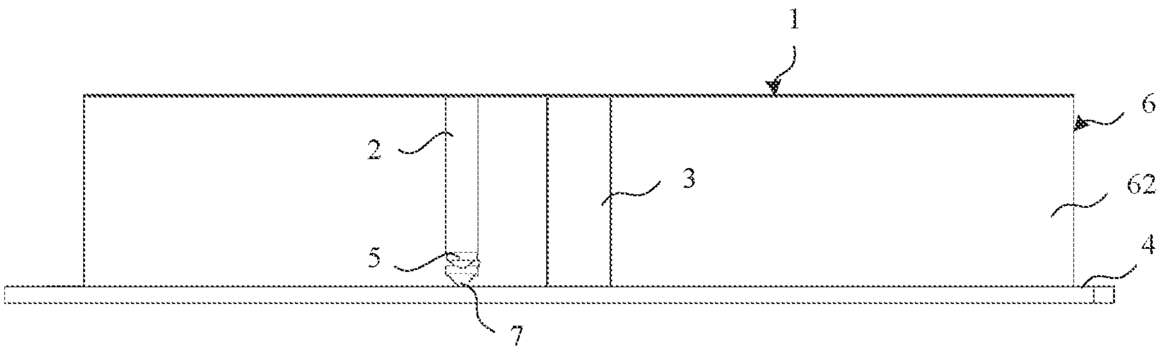
FIG. 9 is a side view of an antenna apparatus connected to a ground plane according to another embodiment of this application.
Figure 10:
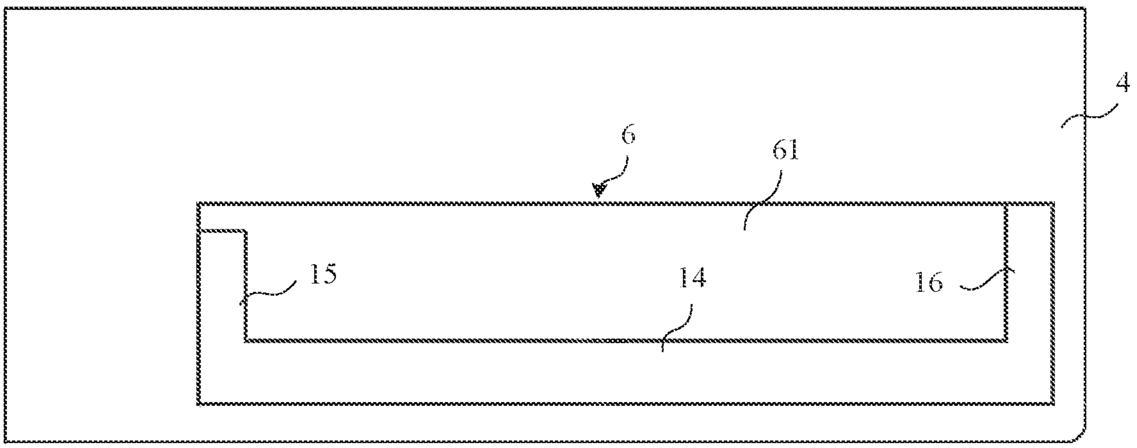
FIG. 10 is a top view of an antenna apparatus connected to a ground plane according to another embodiment of this application.

In another specific implementation, FIG. 8 is a schematic diagram of a state in which an antenna apparatus is connected to a ground plane according to another embodiment of this application. FIG. 9 is a side view of an antenna apparatus connected to a ground plane according to another embodiment of this application. FIG. 10 is a top view of an antenna apparatus connected to a ground plane according to another embodiment of this application. As shown in FIG. 8 to FIG. 10, the antenna apparatus includes an antenna patch 1, a feed line 2, a ground line 3, and a dielectric block 6. The dielectric block 6 is connected to a ground plane 4, and the antenna patch 1, the feed line 2, and the ground line 3 each are attached to the dielectric block 6. The dielectric block 6 and the ground plane 4 may be made of a same material, for example, ceramic, epoxy resin, polytetrafluoroethylene, an FR-4 composite material, or an F4B composite material.

The antenna apparatus is attached to the dielectric block 6, so that the antenna apparatus forms an on-board antenna. There is no clearance area for the antenna, and therefore less space on the ground plane 4 is used. This helps arrange more components. The antenna apparatus may be disposed at a position close to a corner of the ground plane 4, to avoid obstruction by another component. In this way, the antenna apparatus has better radiation performance.

As shown in FIG. 8 and FIG. 9, a capacitance value in this embodiment is 1.3 pF. Due to a capacitor 5, the antenna can form three resonance circuits, to implement bandwidth expansion. As a result, better port matching is implemented for the antenna in a required specific frequency band, and there is no need to design a complex shape for the antenna to change a resonance frequency. This helps simplify a shape of the antenna.

Specifically, as shown in FIG. 8 to FIG. 10, the antenna patch 1 includes a second horizontal radiating metal patch 14, a third vertical radiating metal patch 15, and a fourth vertical radiating metal patch 16, the third vertical radiating metal patch 15 and the fourth vertical radiating metal patch 16 are respectively vertically connected to two ends of the second horizontal radiating metal patch 14, and the second horizontal radiating metal patch 14, the third vertical radiating metal patch 15, and the fourth vertical radiating metal patch 16 each are attached to a top face 61 of the dielectric block 6. The feed line 2 and the ground line 3 each are attached to a side face 62 that is of the dielectric block 6 and that is adjacent to the top face 61, and one end of the feed line 2 and one end of the ground line 3 that face away from the ground plane 4 each are connected to the second horizontal radiating metal patch 14.

The dielectric block 6 may be a regular cuboid like a cuboid or a cube, or certainly may be an irregular cuboid. In this embodiment, the dielectric block 6 is preferably a cuboid. The top face 61 of the dielectric block 6 is a surface of a side facing away from the ground plane 4, and is parallel to the ground plane 4. A bottom face of the dielectric block 6 is connected to the ground plane 4. The dielectric block 6 has four side faces 62. The second horizontal radiating metal patch 14, the third vertical radiating metal patch 15, and the fourth vertical radiating metal patch 16 each are attached to the top face 61 of the dielectric block 6. The feed line 2 and the ground line are preferably attached to the side face 62 that is of the dielectric block 6 and that faces the outside of the ground plane 4. This helps radiate an electromagnetic wave.

There is no need to reserve a clearance area on the ground plane 4 for the antenna apparatus provided in this embodiment, and less space on the ground plane 4 is used. In addition, the antenna apparatus is attached to the dielectric block 6, so that the antenna has a larger radiation area, and stability of the antenna apparatus can be ensured.

Specifically, as shown in FIG. 10, a length of the third vertical radiating metal patch 15 is less than a length of the fourth vertical radiating metal patch 16. This helps excite three different resonances, to expand a low-frequency bandwidth of the antenna apparatus.

Specifically, the ground line 3 is connected to a position that is a first distance from a center position of the second horizontal radiating metal patch 14 in a direction toward the third vertical radiating metal patch 15. Because the length of the third vertical radiating metal patch 15 is less than the length of the fourth vertical radiating metal patch 16, the antenna apparatus is not of a symmetric structure. A position of the ground line 3 is closer to the third vertical radiating metal patch 15 whose length is smaller. This helps excite three difference resonances, to expand a low-frequency bandwidth of the antenna apparatus.

The first distance may be 3 mm. In this embodiment, a length of the second horizontal radiating metal patch 14 is 93 mm, a distance between the second horizontal radiating metal patch 14 and the ground plane 4 is 18.03 mm, a width of the ground line 3 is 6 mm, and a width of the feed line 2 is 3 mm. The feed line 2 and the ground line 3 are spaced apart by a preset second distance. Specifically, the second distance may range from 6.5 mm to 8 mm. In this embodiment, the feed line 2 and the ground line 3 are spaced apart by 6.5 mm. Due to the spacing, the three resonances excited by the antenna apparatus can cover 698 MHz to 1500 MHz.

Certainly, dimensions of the antenna patch 1, the feed line 2, and the ground line 3 may also be adaptively adjusted. In this way, a resonance frequency of the antenna apparatus can be adjusted to control a bandwidth of the antenna, so that the antenna apparatus can be used in different application scenarios.

Figure 11:
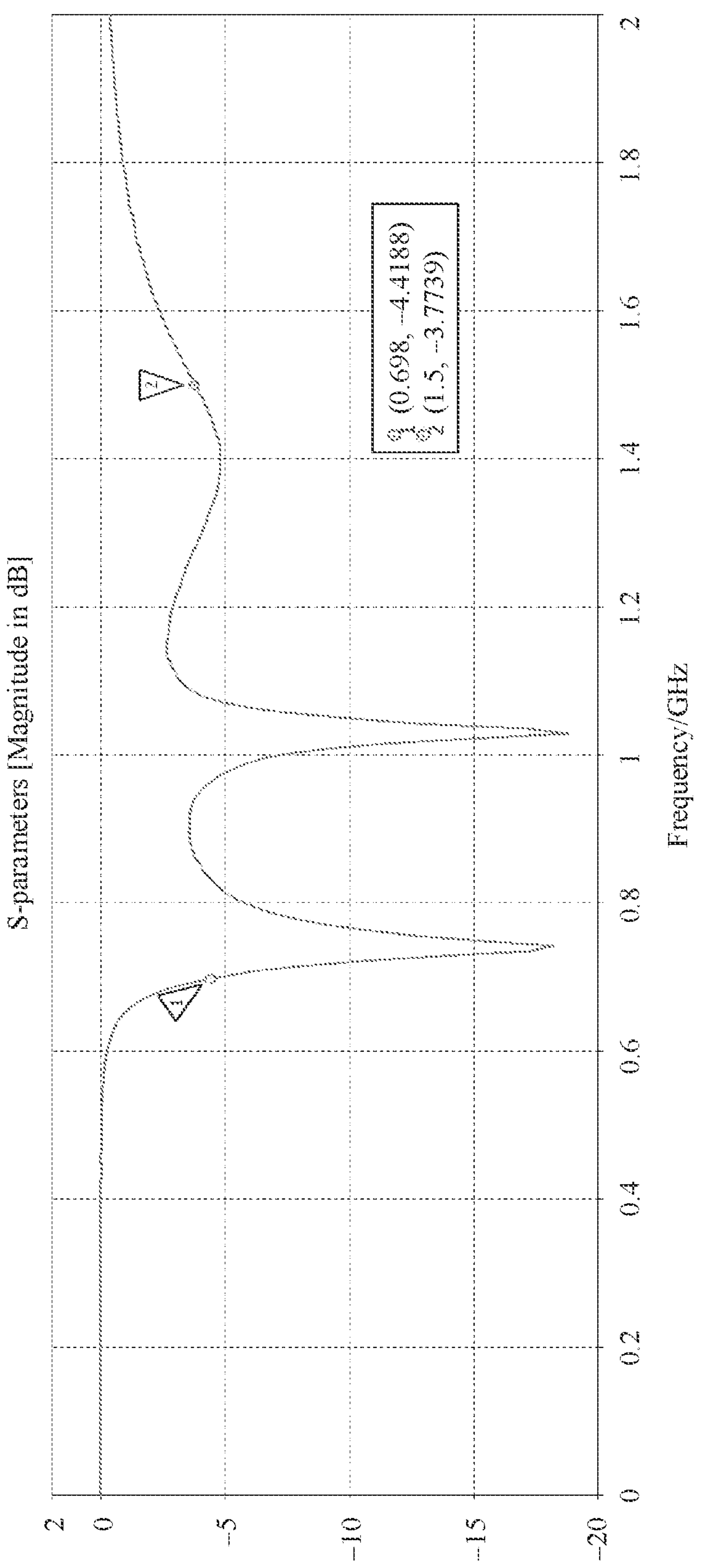
FIG. 11 is a diagram of a simulated S11 curve of an antenna apparatus according to another embodiment of this application.
Figure 12:
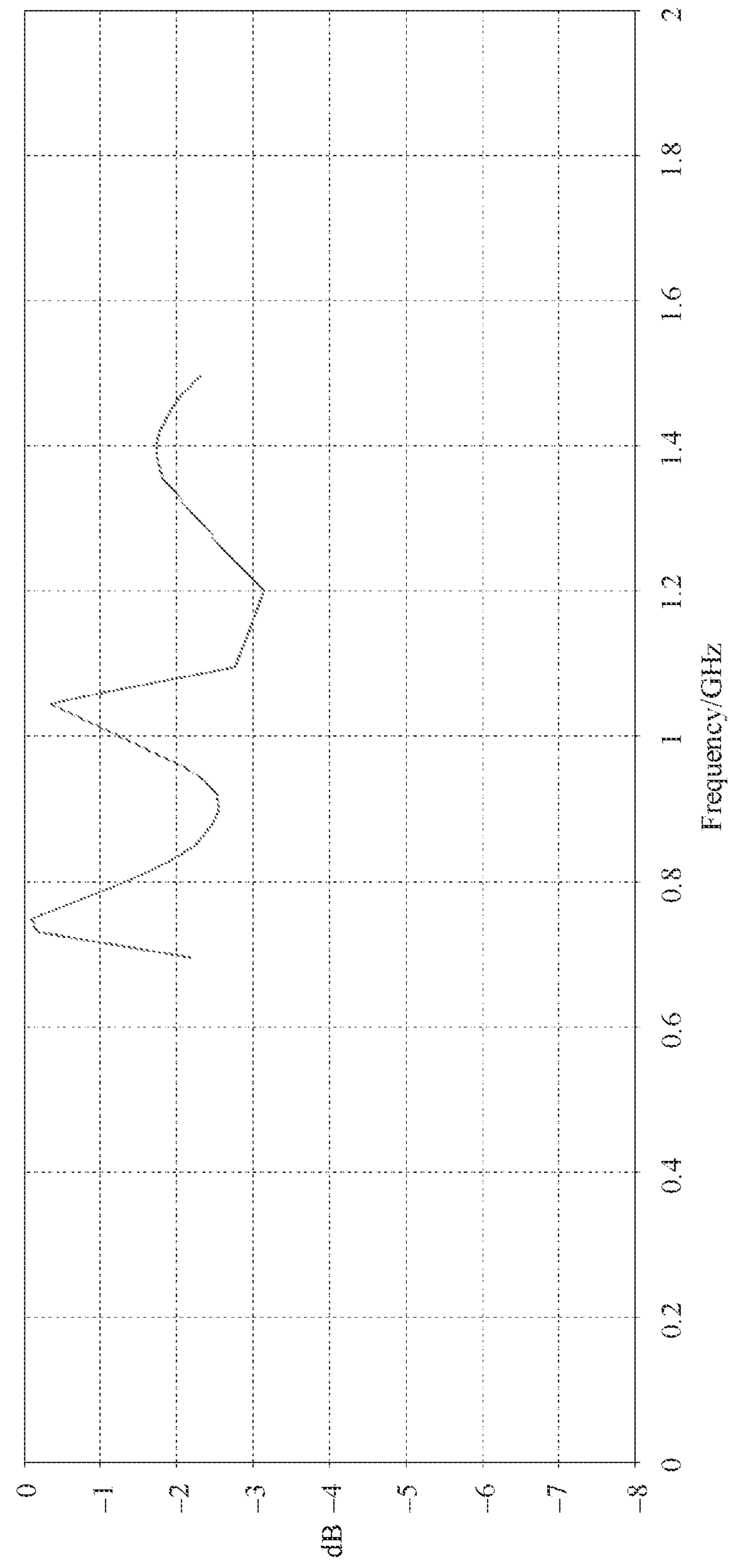
FIG. 12 is a diagram of an efficiency curve of an antenna apparatus according to another embodiment of this application.

FIG. 11 is a diagram of a simulated S11 curve of an antenna apparatus according to another embodiment of this application. S11 represents input return loss. As shown in FIG. 11, the antenna apparatus excites three resonances that can cover a low-frequency bandwidth of 698 MHz to 1500 MHz. At a frequency of 698 MHz, the return loss is −4.4188 dB. At a frequency of 1500 MHz, the return loss is −3.7739 dB. Therefore, in the low-frequency bandwidth of 698 MHz to 1500 MHz, the return loss of the antenna apparatus is relatively low, and the antenna apparatus has good radiation performance. FIG. 12 is a diagram of an efficiency curve of an antenna apparatus according to another embodiment of this application. As shown in FIG. 12, the antenna apparatus has good radiation performance in a frequency band of 698 MHz to 1500 MHz.

Figure 13:
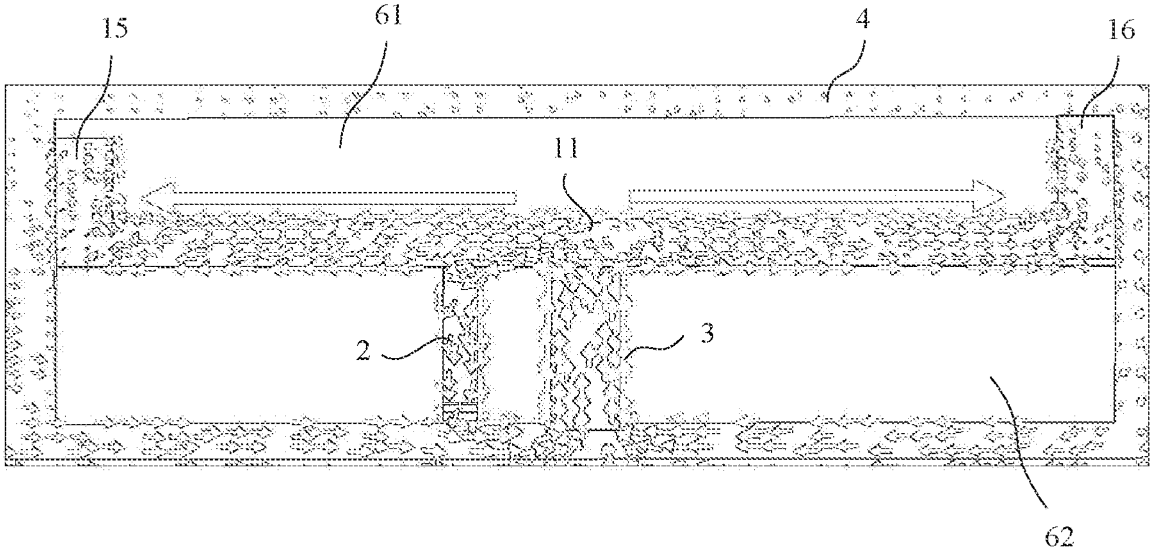
FIG. 13 is a schematic diagram of current distribution of an antenna apparatus in a first common mode according to another embodiment of this application.
Figure 14:
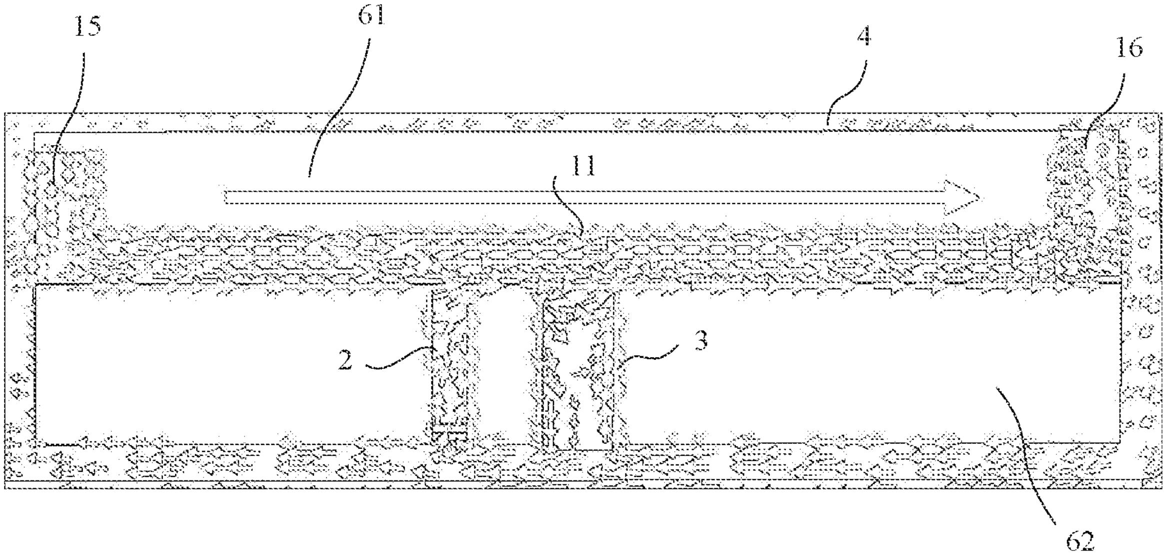
FIG. 14 is a schematic diagram of current distribution of an antenna apparatus in a differential mode according to another embodiment of this application.
Figure 15:
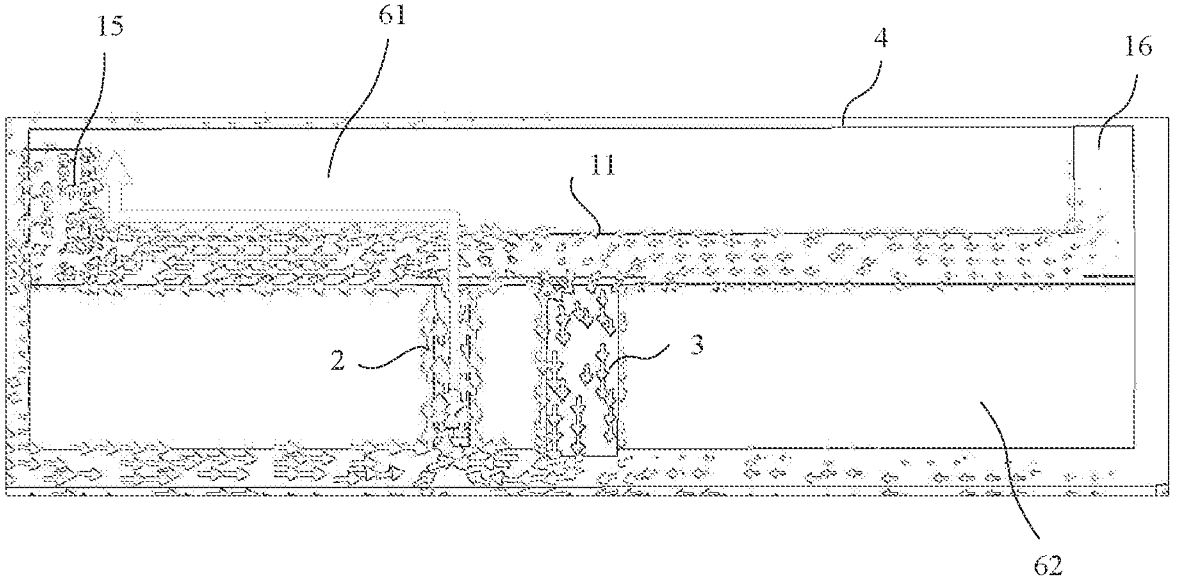
FIG. 15 is a schematic diagram of current distribution of an antenna apparatus in a second common mode according to another embodiment of this application.

In this embodiment, three resonance operation modes are a first common mode, a differential mode, and a second common mode. FIG. 13 is a schematic diagram of current distribution of an antenna apparatus in a first common mode according to another embodiment of this application. FIG. 14 is a schematic diagram of current distribution of an antenna apparatus in a differential mode according to another embodiment of this application. FIG. 15 is a schematic diagram of current distribution of an antenna apparatus in a second common mode according to another embodiment of this application. FIG. 13 to FIG. 15 are schematic diagrams of the antenna apparatus in an unfolded state, so that overall current distribution is displayed. As shown in FIG. 13 to FIG. 15, the antenna patch 1, the feed line 2, the ground line 3, and the ground plane 4 form three different resonance circuits. The three resonance circuits cover different low-frequency bands. As a result, the antenna apparatus achieves a relatively large low-frequency bandwidth.

Embodiments of this application further provide a terminal device, including the antenna apparatus provided in any embodiment of this application. The terminal device may be a handheld device, a vehicle-mounted device, or the like that has a wireless connection function. Common terminals include, for example, a mobile phone, a tablet computer, a notebook computer, a palmtop computer, a mobile internet device (mobile internet device, MID), and a wearable device like a smartwatch, a smart band, or a pedometer.

According to the terminal device provided in embodiments of this application, three resonance modes excited by the antenna apparatus are used to expand a low-frequency bandwidth to a great extent, so that radiation performance of the antenna apparatus is improved.

The foregoing describes merely preferred embodiments of this application, but are not intended to limit this application. For a person skilled in the art, various modifications and changes may be made in this application. Any modification, equivalent replacement, or improvement made without departing from the spirit and principle of this application shall fall within the protection scope of this application.

What is claimed is:

1. An antenna apparatus, comprising:
- an antenna patch comprising:
  - a first horizontal radiating metal patch comprising two ends:
  - a first vertical radiating metal patch; and
  - a second vertical radiating metal patch,
  - wherein the first vertical radiating metal patch and the second vertical radiating metal patch are respectively vertically connected to the two ends of the first horizontal radiating metal patch;
- a capacitor;
- a feed line, wherein a first end of the feed line is connected to the antenna patch, and wherein a second end of the feed line is connected in series to the capacitor;
- a feed point connected to the capacitor; and
- a ground line,
- wherein a first end of the ground line is connected to the antenna patch,
- wherein a second end of the ground line is configured to couple with a ground plane,
- wherein the antenna patch and the ground plane are spaced apart,
- wherein the first vertical radiating metal patch and the second vertical radiating metal patch extend toward the ground plane, and
- wherein the antenna patch, the feed line, the capacitor, and the ground line are configured to excite operation modes corresponding to three resonances to encompass a frequency band of 698 megahertz (MHz) to 1500 MHz.

2. The antenna apparatus of claim 1, wherein the first end of the feed line and the first end of the ground line are connected to the first horizontal radiating metal patch, wherein the feed line is disposed between the ground line and the first vertical radiating metal patch, wherein the ground line is connected to a center position of the first horizontal radiating metal patch, and wherein the first vertical radiating metal patch and the second vertical radiating metal patch are symmetrically distributed with respect to a position of the ground line.

3. The antenna apparatus of claim 1, wherein the operation modes corresponding to the three resonances are a first common mode, a differential mode, and a second common mode, wherein in the second common mode a local current is sequentially directed through the feed line, a portion of the first horizontal radiating metal patch that is located between the feed line and the first vertical radiating metal patch, and the first vertical radiating metal patch, and wherein a sum of a length of the feed line, a length of the portion of the first horizontal radiating metal patch that is located between the feed line and the first vertical radiating metal patch, and a length of the first vertical radiating metal patch is ¼ of a resonance wavelength of the second common mode.

4. The antenna apparatus of claim 1, further comprising a dielectric block connected to the ground plane, the antenna patch, the feed line, and the ground line.

5. The antenna apparatus of claim 4, wherein the antenna patch comprises:

a second horizontal radiating metal patch;

a third vertical radiating metal patch; and a fourth vertical radiating metal patch, wherein the third vertical radiating metal patch and the fourth vertical radiating metal patch are respectively vertically connected to two ends of the second horizontal radiating metal patch, wherein the second horizontal radiating metal patch, the third vertical radiating metal patch, and the fourth vertical radiating metal patch each are attached to a top face of the dielectric block, wherein the feed line and the ground line are each attached to a side face of the dielectric block that is adjacent to the top face, and wherein the first end of the feed line and the first end of the ground line are each connected to the second horizontal radiating metal patch.

6. The antenna apparatus of claim 5, wherein a length of the third vertical radiating metal patch is less than a length of the fourth vertical radiating metal patch.

7. The antenna apparatus of claim 5, wherein the ground line is connected a first distance from a center position of the second horizontal radiating metal patch, wherein the first distance is in a direction toward the third vertical radiating metal patch.

8. The antenna apparatus of claim 7, wherein the first distance is 3 millimeters (mm).

9. The antenna apparatus of claim 1, wherein the feed line and the ground line are spaced apart by a preset second distance.

10. The antenna apparatus of claim 9, wherein the preset second distance ranges from 6.5 millimeters (mm) to 8 mm.

11. A terminal device, comprising:

an antenna apparatus, comprising:

an antenna patch comprising:

a first horizontal radiating metal patch comprising two ends:

a first vertical radiating metal patch; and a second vertical radiating metal patch, wherein the first vertical radiating metal patch and the second vertical radiating metal patch are respectively vertically connected to the two ends of the first horizontal radiating metal patch;

a capacitor;

a feed line, wherein a first end of the feed line is connected to the antenna patch, and wherein a second end of the feed line is connected to the capacitor in series;

a feed point connected to the capacitor; and a ground line, wherein a first end of the ground line is connected to the antenna patch, wherein a second end of the ground line is configured to couple with a ground plane, wherein the antenna patch and the ground plane are spaced apart, wherein the first vertical radiating metal patch and the second vertical radiating metal patch extend toward the ground plane, and wherein the antenna patch, the feed line, the capacitor, and the ground line are configured to excite operation modes corresponding to three resonances to encompass a frequency band of 698 megahertz (MHz) to 1500 MHz.

12. The terminal device of claim 11, wherein the first end of the feed line and the first end of the ground line are connected to the first horizontal radiating metal patch, and wherein the feed line is disposed between the ground line and the first vertical radiating metal patch.

13. The terminal device of claim 12, wherein the ground line is connected to a center position of the first horizontal radiating metal patch, and wherein the first vertical radiating metal patch and the second vertical radiating metal patch are symmetrically distributed with respect to a position of the ground line.

14. The terminal device of claim 12, wherein the operation modes corresponding to the three resonances are a first common mode, a differential mode, and a second common mode, wherein in the second common mode a local current is sequentially directed through the feed line, a portion of the first horizontal radiating metal patch that is located between the feed line and the first vertical radiating metal patch, and the first vertical radiating metal patch, and wherein a sum of a length of the feed line, a length of the portion of the first horizontal radiating metal patch that is located between the feed line and the first vertical radiating metal patch, and a length of the first vertical radiating metal patch is ¼ of a resonance wavelength of the second common mode.

15. The terminal device of claim 11, further comprising a dielectric block connected to the ground plane, the antenna patch, the feed line, and the ground line.

16. The terminal device of claim 15, wherein the antenna patch comprises:

a second horizontal radiating metal patch;

a third vertical radiating metal patch; and a fourth vertical radiating metal patch, wherein the third vertical radiating metal patch and the fourth vertical radiating metal patch are respectively vertically connected to two ends of the second horizontal radiating metal patch, wherein the second horizontal radiating metal patch, the third vertical radiating metal patch, and the fourth vertical radiating metal patch each are attached to a top face of the dielectric block, wherein the feed line and the ground line are each attached to a side face of the dielectric block that is adjacent to the top face, and wherein the first end of the feed line and the first end of the ground line are each connected to the second horizontal radiating metal patch.

17. The terminal device of claim 16, wherein a length of the third vertical radiating metal patch is less than a length of the fourth vertical radiating metal patch.

18. The terminal device of claim 16, wherein the ground line is connected a first distance from a center position of the second horizontal radiating metal patch, wherein the first distance is 3 millimeters (mm) in a direction toward the third vertical radiating metal patch.

19. The terminal device of claim 11, wherein the feed line and the ground line are spaced apart by 6.5 millimeters (mm) to 8 mm.

20. An antenna apparatus, comprising:

an antenna patch;

a capacitor;

a feed line, wherein a first end of the feed line is connected to the antenna patch, and wherein a second end of the feed line is connected in series to the capacitor;

a feed point connected to the capacitor; and a ground line, wherein a first end of the ground line is connected to the antenna patch, wherein a second end of the ground line is configured to couple with a ground plane, wherein the feed line and the ground line are spaced apart by a preset second distance, wherein the preset second distance ranges from 6.5 millimeters (mm) to 8 mm, wherein the antenna patch and the ground plane are spaced apart, and wherein the antenna patch, the feed line, the capacitor, and the ground line are configured to excite operation modes corresponding to three resonances to encompass a frequency band of 698 megahertz (MHz) to 1500 MHz.

* * * * *